Aug. 11, 1953 R. D. MITCHELL ET AL 2,648,177
ABRASIVE WHEEL AND BRUSHING THEREFOR
AND METHOD OF MAKING SAME
Filed March 24, 1951 2 Sheets-Sheet 2

INVENTORS
ROBERT D. MITCHELL
RAYMOND F. PAHL
HARMAN M. HUNTER
BY
ATTORNEY

UNITED STATES PATENT OFFICE 2,648,177

ABRASIVE WHEEL AND BUSHING THEREFOR AND METHOD OF MAKING SAME

Robert D. Mitchell, Raymond F. Pahl, and Harman M. Hunter, Niagara Falls, N. Y., assignors to The Carborundum Company, Niagara Falls, N. Y., a corporation of Delaware Application March 24, 1951, Serial No. 217,342

10 Claims. (Cl. 51—168)

This invention relates to abrasive wheels and is particularly concerned with new and improved bushings therefor. It also relates to methods for forming bushings in the arbor or mounting holes of abrasive wheels.

It is an object of the present invention to provide abrasive wheels having new and improved bushings which offer various advantages over the various types of prior art bushings and also avoid many of the limitations and disadvantages of bushings heretofore used.

It is also an object of the invention to provide a novel and inexpensive method of installing or forming bushings in abrasive wheels.

Figure 1:
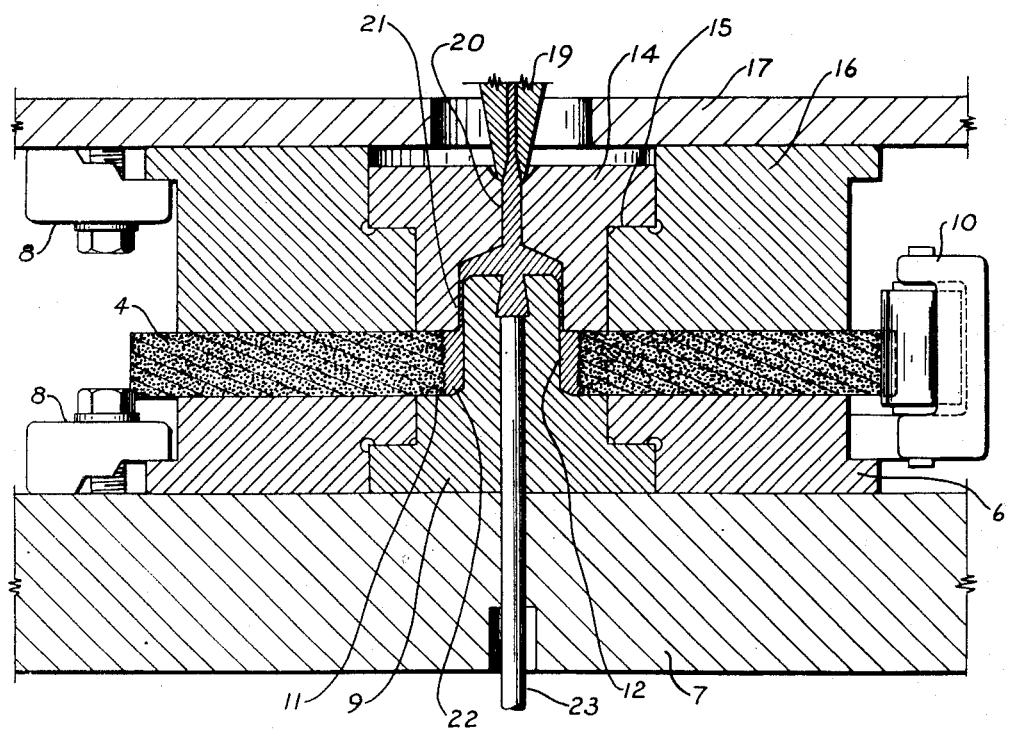
Figure 2:
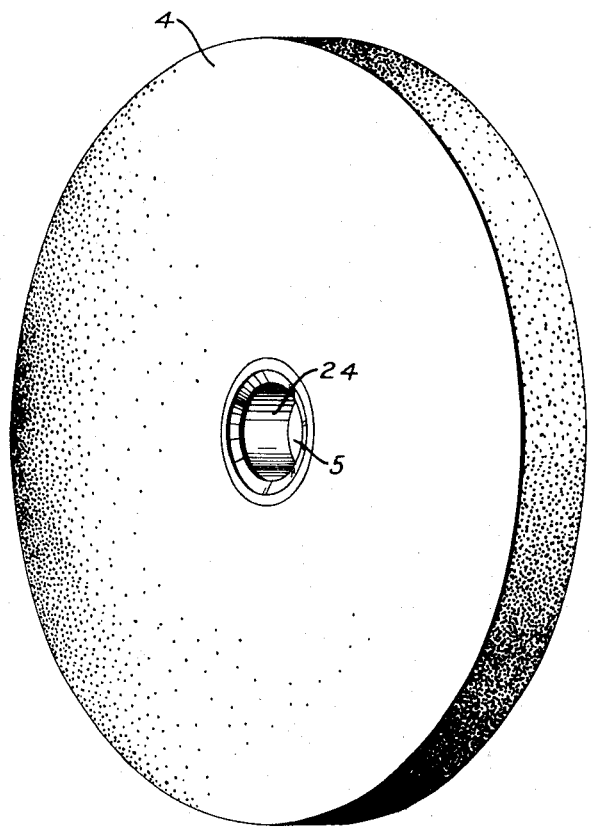
Figure 3:
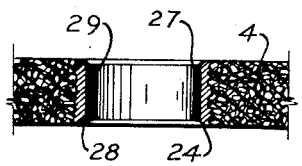

In order that the invention may be fully understood, reference is made to the accompanying drawings in which, Figure 1 is a sectional elevational view depicting diagrammatically apparatus suitable for forming bushings in abrasive wheels in accordance with the teachings of the present invention;

Figure 2 is a perspective view of an abrasive wheel embodying a bushing of the herein-described type; and Figure 3 is a highly enlarged vertical section of a fragmentary part of an abrasive wheel showing the manner in which the bushing is secured to the adjoining portion of the abrasive wheel body.

In accordance with the present invention we have discovered that an improved bushing in an abrasive wheel can be obtained by forming the bushing of a thermally plastic material such as an organic thermoplastic resin composition or an organic thermosetting resin composition in plastic condition by a technique wherein the material of the bushing is forced into the arbor hole or mounting hole of the abrasive wheel under pressure while the material is in a plastic condition and the material allowed to solidify or set about a core member to form a bushing having the desired arbor hole diameter and securely held in position by its close conformance to the granular configurations of the original arbor hole or mounting hole within the wheel. A preferred method of installing or forming an organic plastic bushing of the herein-described type within the mounting hole of an abrasive wheel is by an injection molding method wherein the abrasive wheel is seated upon a lower or moving platen of an injection molding machine with a core pin extending into the arbor hole of the wheel and equidistantly spaced from the walls of the arbor hole. The upper or fixed platen and die cap structure of the injection molding machine is then positioned against one side of the abrasive wheel so that the wheel body constitutes the side walls or barrel of a mold. The desired plastic material is then forced under positive pressure from the nozzle of the injection molding machine through a suitable sprue and runner system into the annular space between the core pin and the arbor wall of the wheel body to form the desired bushing. Upon solidification of the thusly molded bushing the platen or platens of the injection molding machine are separated, and the wheel removed and separated from the attached runner and sprue. The normally high pressure used in injection molding operations, being in the neighborhood of 5,000 to 40,000 pounds per square inch pressure, forces the plastic material into the arbor hole of the wheel with sufficient force that the material is pressed against the side walls of the wheel arbor hole so that the bushing is closely adherent to the arbor hole walls of the wheel body and follows the individual granular configurations thereof in detail. This serves to mechanically key the bushing to the wheel body in such a way as to guarantee against the movement of the bushing in respect of the abrasive body in any direction during the subsequent handling and operation of the abrasive wheel.

Although we prefer to use an organic thermoplastic resin composition as the material for the bushing particularly because of the ease and speed with which the bushing can be molded in situ within the wheel arbor or mounting hole by means of injection molding methods, the present invention can be modified in certain respects both as to the composition used for the bushing and also the particular method of forming the bushing within the wheel arbor. For example, organic thermosetting resinous compositions can be effectively used in which case the bushing is desirably formed within the wheel arbor by either a modified form of injection molding adapted for use with thermosetting resins and known as jet molding or by a type of molding known as transfer molding.

We have obtained highly satisfactory results with injection molding methods using cellulose acetate and cellulose acetate-butyrate organic thermoplastic injection molding compositions as the material for forming the bushing. Cellulose acetate and cellulose acetate-butyrate injection molding compounds are available on the market in powder or granular form under the trademark names of "Tenite I" and "Tenite II" injection molding compounds, sold by Tennessee Eastman Corporation. The same materials are also sold by Celanese Plastic Corporation under the trade-mark name of "Lumarith" injection molding compounds. The recommended temperature range for injection molding of cellulose acetate and cellulose acetate-butyrate compositions extends from around 315° F. to as high as 480° F., depending upon the size of the piece to be molded. Since the wall thickness of the bushing, regardless of diameter, is not usually very thick and the bulk volume of the bushing is therefore not large, the lower injection molding temperatures will suffice.

Other organic thermoplastic resins which can be used in place of cellulose acetate and cellulose acetate-butyrate for forming bushings in accordance with the present invention include such materials as ethyl cellulose, acrylics such as methyl methacrylate resins, polystyrene, copolymers of vinyl chloride and vinyl acetate, polyethylene, polyamides, otherwise commonly known under the name of nylon, polyvinyl carbazole, vinylidene chloride polymers, polydichlorostyrene and copolymers of vinyl chloride and vinylidene chloride. All the above organic thermoplastic resinous materials are available on the market under various trade names and their particular properties described in the literature, including the recommended ranges of temperature suitable for use in injection molding of the various compositions. Depending upon the particular material selected for use the temperature range for injection molding of such materials may be as low as 280° F. for certain vinyl chloride-acetate copolymers up to as high as 530° F. for certain polystyrene materials.

Organic thermoplastic resin compositions in injection molded form, such as those specifically recited above, are outstanding in strength and toughness over a relatively wide range of temperatures which are broad enough to embrace those temperatures normally encountered at the arbor hole of grinding wheels in use, are chemically inert to water and most acids and alkalies, and many of the above plastic materials, such as, for example, the polyamides are not attacked by oil, grease and many solvents. Therefore, the bushings can be used in abrasive wheels which are used in both dry and wet grinding operations where various coolants are used with the wheel.

Various organic thermosetting resins can also be used to form the bushing in grinding wheels although such materials are not particularly well-adapted for use in injection molding operations in exactly the same manner used in handling the aforementioned thermoplastic resinous materials. However, many thermosetting resin compositions can be used in conjunction with a modified form of injection molding known as jet molding, or by a modification of molding known as transfer molding, both of which are particularly adapted to accommodate the use of thermosetting materials for molding operations comparable to injection molding of thermoplastic resinous compounds. Such thermosetting resins can be used as, for example, general purpose phenolic resins, such as phenol-formaldehyde resins, urea-formaldehyde resins, melamine-formaldehyde resins, and allyl resins.

The various resins, whether thermoplastic or thermosetting, can be modified by the inclusion of various organic or mineral fillers and the like without departing from the spirit of the present invention.

Referring further to Figure 1, which shows an injection molding apparatus for carrying out the present invention, the invention can be best understood by a description of the apparatus shown and the manner of using it to form a plastic bushing in a conventional arbored grinding wheel. The abrasive wheel 4 having a centrally located arbor hole 5 is placed upon the bottom half 6 of a guided die set which in turn rests upon the bottom moving platen 7 of an injection molding machine of conventional design. A complete injection molding machine is not shown since such equipment is well known in the art and constitutes no part of the present invention, and is not required to be described herein for a full understanding of the present invention. The lower die set block 6 is clamped to the lower platen 7 by means of suitable clamping means 8. The abrasive wheel is centered over a core pin 9 by means of a three-jaw, wheel centering device, one arm 10 of which is shown in Figure 1. The core pin extends through and somewhat above the top face of the grinding wheel which is seated upon a shoulder 11 of the core pin 9 and spaced from the vertical walls 12 of the core pin. A top molding cap member or sprue bushing 14 is then positioned over the core pin 9 as shown with the shoulders 15 of the sprue bushing engaging the upper half 16 of the guided die set of the injection molding machine. The upper half 16 of the guided die set is in turn clamped to the upper or fixed platen 17 of the injection molding machine by suitable clamps 8 which are the same as the clamps securing the lower die set block 6 to moving platen 7. As shown in Figure 1, the moving platen 7 of the molding machine with the abrasive wheel in proper position has been elevated to the point where the core pin and sprue bushing, together with the abrasive wheel itself, together constitute a mold for the bushing to be formed. The nozzle 19 of the injection molding machine is in line with the sprue 20 which connects with a connecting system of runners 21 which lead through the sprue bushing to the annular area 22 defined by the inner arbor hole walls of the wheel and the inner core pin. A mass of thermoplastic resinous injection molding composition, such as a cellulose acetate-butyrate injection molding powder, as for example, that made and sold by the Tennessee Eastman Corporation as "Tenite II" granular molding material is then heated in the injection molding nozzle chamber to a temperature of around 400° F. and a pressure over 5,000 pounds per square inch applied to force the plastic material into and through the sprue 20 and runner 21 in sufficient quantity to fill the annular space 22 between the wheel body and the core pin and extending up through the runner and into the sprue 20. After the injected material has solidified or set, which is usually a matter of a few seconds depending upon the mass of material injected, the moving platen 7 of the injection molding machine is lowered. A conventional knock-out pin 23 is used to remove the sprue. The abrasive wheel is then lifted off the core pin and any remnant of the runners which may be attached to the molded bushing 24 knocked off. The bushing which is thus formed is finished for use without further processing.

Although the specific apparatus described has been shown with the injection machine vertically disposed, it is obvious that the injection machine can be horizontally disposed without departing from the spirit and scope of the invention.

Referring to Figures 2 and 3 which show the abrasive wheel 4 with a thermoplastic organic resin bushing 24 as provided by the above-described injection molded method, it is to be noted that the bushing is molded in situ within the arbor hole of the wheel with sufficient pressure that the material of the bushing is forced into the individual granular configurations 27 of the arbor hole wall of the wheel body so that some of the bushing material forms small projections 28 which are keyed into the surface roughness making up the wall of the arbor hole so that the bushing is mechanically locked into position thereby guaranteeing against subsequent dislocation or movement of the bushing in any direction during the normal operation of the grinding wheel. The mounting wall 29 of the bushing is smooth and true centered without further processing so that the formation of the bushing within the wheel is accomplished without the mechanical labor of dressing and truing.

The injection molded or comparably formed bushings installed within the grinding wheel in accordance with the teachings of the present invention offer numerous advantages over the prior art practice in respect of bushing abrasive wheels. For example, such bushings when composed of an organic resinous material of the herein-described type are relatively thin and light in weight although possessing adequate strength and toughness to stand up under all normal conditions of use. Lightness in weight and reduction in the overall mass of bushings, both of which are accomplished by the present invention, are desirable since they offer the added advantage of contributing to a less degree to any wheel off balance which might be caused by irregularities of the wheel. Such bushings are moreover resistant to the various materials commonly used as grinding coolants and to many other materials considered to be corrosive to metals and the like, such as acids and alkalies. Organic plastic bushings can also be thusly molded in various assorted colors so that the bushing can be used as a means of identifying wheel grades or wheel types or species. Also the present method of forming the bushing in situ within the wheel arbor not only assures the maximum amount of security against movement of the bushing within the wheel but also offers obvious economies over the use of bushings which require separate fabrication prior to their installation. It might be said that the present bushings amount to providing a custom built bushing for each wheel since each bushing of necessity conforms to any irregularities in the arbor wall of the particular abrasive wheel body within which it is formed and provides the maximum of fit thereto.

Having described the invention in detail, it is desired to claim:

1. An abrasive wheel comprising a bonded abrasive body having a centrally located arbor hole, and a bushing within said arbor hole, said bushing being composed essentially of an organic resinous material closely conforming to the granular configurations of the arbor hole of said wheel, and said bushing having been injection-molded in situ.

2. An abrasive wheel in accordance with claim 1 in which the bushing comprises an organic thermoplastic resin composition.

3. An abrasive wheel in accordance with claim 1 in which the bushing comprises a cellulose acetate composition.

4. An abrasive wheel in accordance with claim 1 in which the bushing comprises a cellulose acetate-butyrate composition.

5. An abrasive wheel in accordance with claim 1 in which the bushing comprises a polystyrene composition.

6. An abrasive wheel in accordance with claim 1 in which the bushing comprises a copolymer of vinyl chloride and vinyl acetate.

7. An abrasive wheel in accordance with claim 1 in which the bushing comprises a polyamide thermoplastic resin composition.

8. A method of bushing an arbored abrasive wheel which comprises placing said wheel about a centrally positioned core member so that said wheel acts as the side walls of a mold, injecting a mass of plastic material into the arbor hole of said wheel about said core member under pressure, allowing said plastic material to harden as a closely adherent lining to the arbor walls, and removing said core member from the lined arbor hole of said wheel.

9. A method of bushing an arbored abrasive wheel which comprises placing said wheel about a centrally positioned core member so that said wheel acts as the side walls of a mold, injecting a mass of organic thermoplastic resinous material into the arbor hole of said wheel about said core member under pressure, allowing said organic thermoplastic resinous material to harden as a closely adherent lining to the arbor walls, and removing said core member from the lined arbor hole of said wheel.

10. In a bonded abrasive wheel having a mounting hole therein, a bushing injection-molded in situ within said mounting hole comprising an organic resinous material closely adherent to and conforming to the granular surface roughness of the walls of said hole whereby the bushing is mechanically keyed to the abrasive wheel body.

ROBERT D. MITCHELL.
RAYMOND F. PAHL.
HARMAN M. HUNTER.

References Cited in the file of this patent

UNITED STATES PATENTS

| Number | Name | Date |
| --- | --- | --- |
| 2,290,249 | Peperoux | July 21, 1942 |
| 2,519,035 | Esty | Aug. 15, 1950 |

FOREIGN PATENTS

| Number | Country | Date |
| --- | --- | --- |
| 26,437 | Great Britain | Oct. 24, 1907 |